United States Patent [19]

Peiffert et al.

[11] 4,204,146
[45] May 20, 1980

[54] SERVO-CONTROL METHOD AND DEVICE

[76] Inventors: Jean Peiffert, 42 Allee de Persepolis, Orsay, Essonne; Roger S. Barbedienne, 11, rue de Neuvill, Eragny sur Oise, Val d'Oise, both of France

[21] Appl. No.: 911,612

[22] Filed: Jun. 1, 1978

[51] Int. Cl.² .............................................. G05B 1/06
[52] U.S. Cl. ...................................... 318/640; 318/16
[58] Field of Search .......................... 318/640, 16, 480; 324/58.5 B

[56] References Cited

U.S. PATENT DOCUMENTS

| | | | |
|---|---|---|---|
| 3,775,582 | 11/1973 | Iceland | 219/124.34 |
| 4,087,745 | 5/1978 | Kennedy et al. | 324/58 B |
| 4,097,796 | 6/1978 | Lunden | 324/58 B |

FOREIGN PATENT DOCUMENTS 1251362 10/1971 United Kingdom ..................... 318/640

*Primary Examiner*—Benjamin Dobeck
*Attorney, Agent, or Firm*—Karl W. Flocks

[57] ABSTRACT

Method and device for servo-controlling the distance of an object from a transiting surface to be followed by said object and capable of reflecting microwaves, by exploiting a control signal, wherein a radiating unit fast with said object provides directive microwave radiation and a symmetrical detector compares the phases of the radiated microwaves and the reflected microwaves, said detector providing a control signal to a servo-control circuit. The device is namely intended to automatic metal-welding machines in which the welding member forms said object and a metal workpiece forms the reflecting surface to be followed at a predetermined distance by said welding member.

11 Claims, 4 Drawing Figures

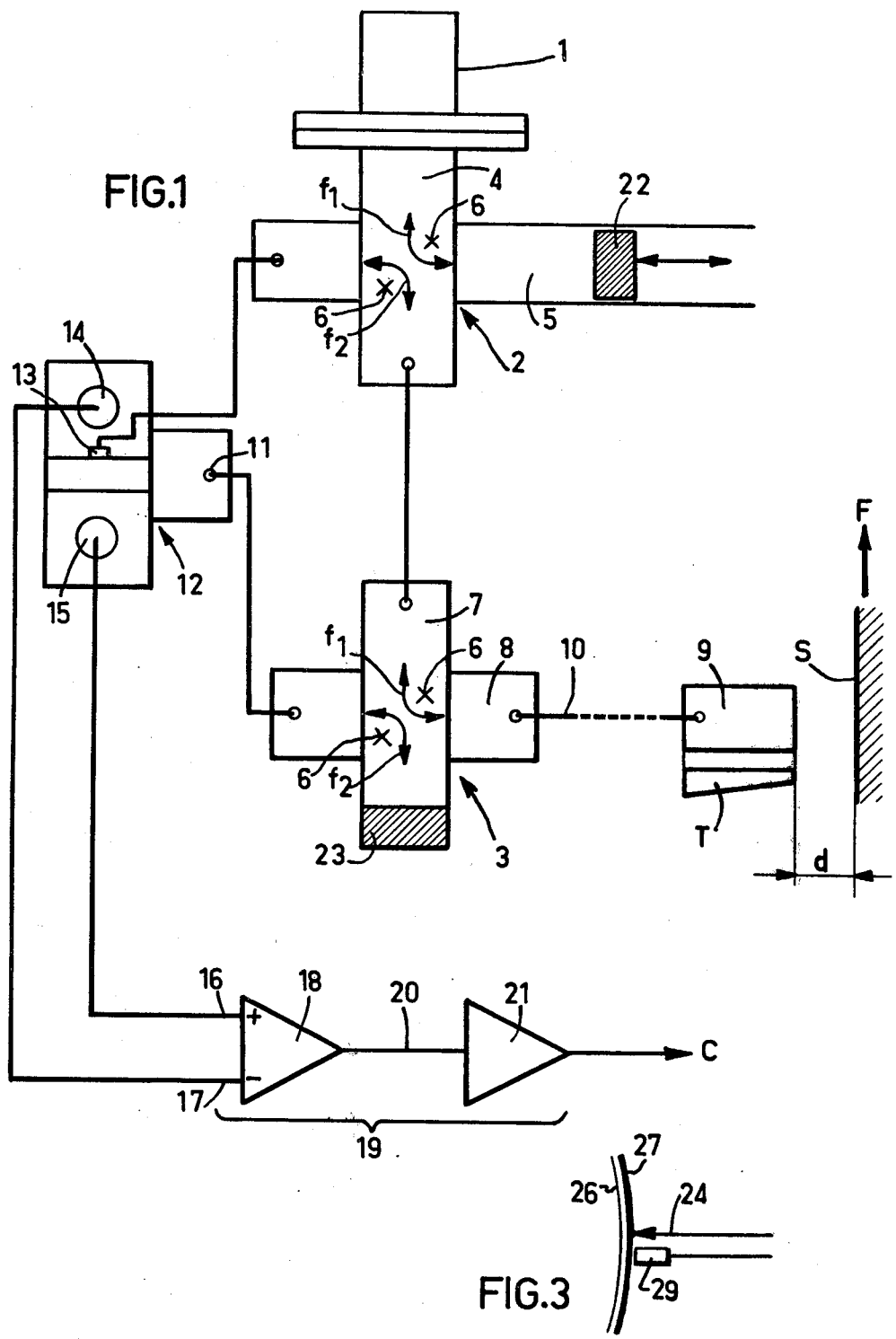

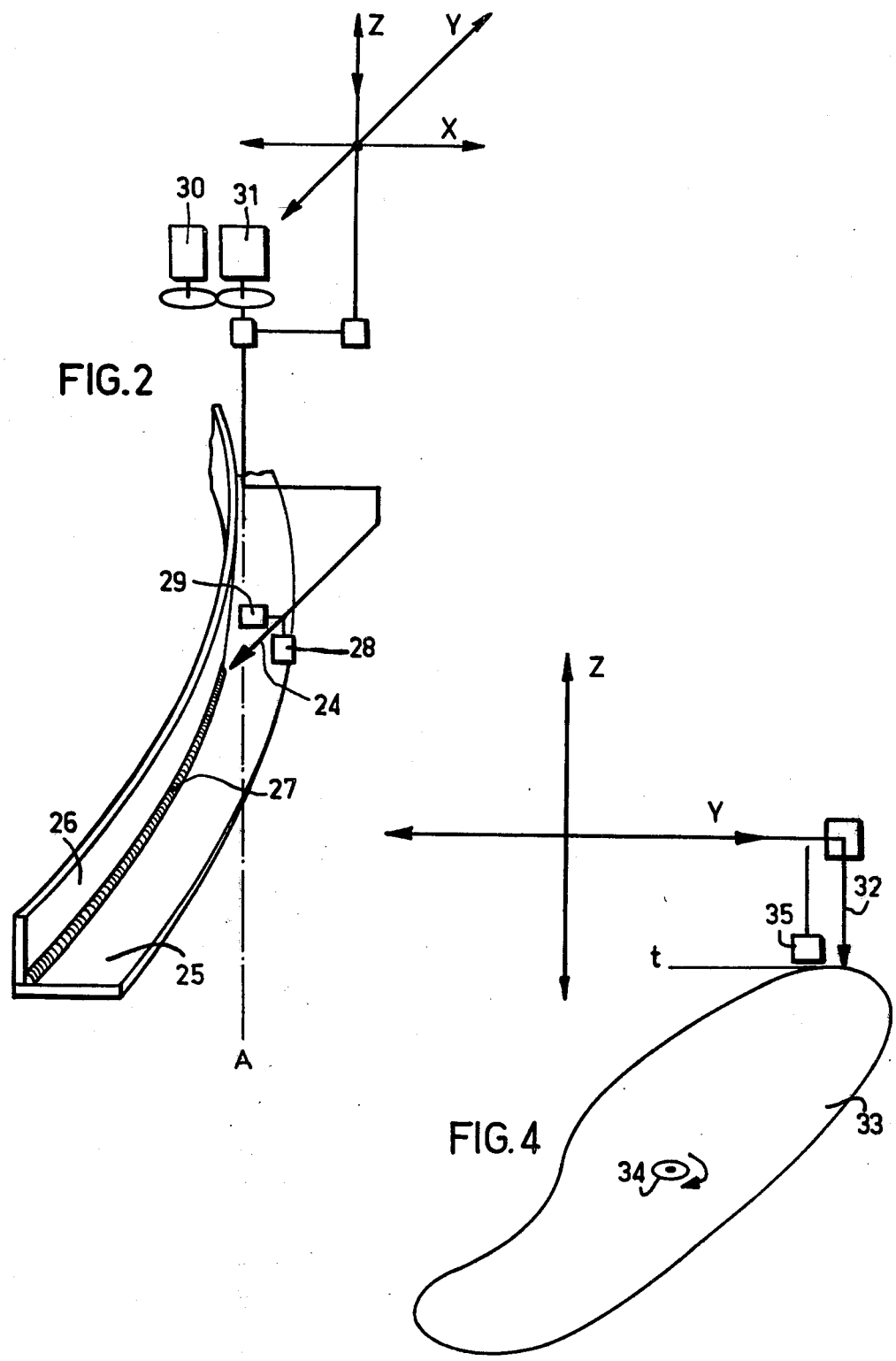

SERVO-CONTROL METHOD AND DEVICE

The present invention relates to a method of servo-controlling the distance separating an object from a surface capable of reflecting microwaves when said object must transit before said surface. The invention includes in its scope a device for performing the said method, applicable in particular to a machine for the automatic welding of metal parts of any shape and size.

As is known, the automatic welding of metal parts is effected by causing a welding member, i.e. a blowpipe or an electrode which is being supplied with welding wire, to transit past the workpiece on which a weld seam is to be made. This relative motion of the welding member and the workpiece must take place with the welding member at a substantially constant distance from the surface or edge of the workpiece, irrespective of the contour thereof.

Prior-art servo-control means of this distance can be divided into two main categories, namely mechanical servo-control and optical servo-control means.

In mechanical servo-control, one or more feelers fixed in relation to the welding member are in contact with the workpiece and any variation in position customarily results in a variation in an electrical signal which activates a servo-control unit which operates by processing an error voltage.

In optical servo-control, the feelers are replaced by units capable of evaluating variations in intensity of illumination, with visible or invisible light, and of likewise generating a usable variable signal.

In certain prior-art devices, the servo-control circuit can be of the digital control type.

These servo-control methods, however, do not give satisfaction in all situations, mainly because of their fragility or their complexity. Further, and particularly with digital control, presently known devices are incapable of following the contour profiles of parts to be welded with sufficiently close tolerances.

It is the object of the present invention to overcome the aforesaid drawbacks by providing a simple but accurate and reliable method of servo-controlling the distance between an object such as a welding member and a workpiece, thereby making it possible in particular to devise automatic welding machines suitable for use under any welding conditions.

The subject method of this invention is characterized essentially by the steps of disposing opposite the surface to be followed at least one microwave-radiating directive unit fixedly positioned in relation to the object, simultaneously picking up the radiation reflected by said surface toward said radiating unit, comparing the phases of the transmitted microwaves and reflected microwaves and slaving the distance between the object and said surface to the value of the signal resulting from such comparison relatively to a predetermined distance.

For the carrying into practice of the above specified method, the subject device of this invention is characterized essentially by the fact that it includes a microwave source connected to the respective first branches of first and second directive cruciform couplers having their second branches respectively connected to the two inputs of a symmetrical microwave phase-comparing detector having its two outputs connected to a servo-control circuit, the second branch of the second coupler being further connected to a directive radiating unit disposed facing the reflecting surface fixedly positioned relative to the object.

The description which follows with reference to the accompanying non-limitative exemplary drawings will give a clear understanding of how the invention can be carried into practice:

In the drawings:

FIG. 1 diagrammatically illustrates a device for performing the subject method of this invention;

FIG. 2 shows diagrammatically a welding machine equipped with two devices according to the invention;

FIG. 3 diagrammatically depicts a detail of the servo-control means; and

FIG. 4 diagrammatically illustrates an alternative embodiment of the servo-control means.

Referring first to FIG. 1, a metallic surface S is possessed of motion F relative to a welding member T such as a blowpipe, the distance d between member T and surface S having to be maintained substantially constant by servo-control. The subject device of the invention accordingly includes a microwave source 1 connected to a first directive coupler 2 and to a second directive coupler 3. These two couplers may be of the kind well known per se, designated "20dB directive couplers". The first coupler 2 comprises a first branch 4 perpendicular to a second branch 5, these two branches being coupled in a manner well known per se via cruciform orifices 6, the coupling between the two branches being represented by the arrows f1 and f2. First branch 4 of first coupler 2 is connected to first branch 7 of second coupler 3, which is of the same type as coupler 2. The second branch 8 of second coupler 3 is connected to a directive radiating unit 9 (hereinafter termed "antenna" for simplification purposes) which is fixed in relation to member T and arranged substantially perpendicularly to surface S. The link between branch 8 and antenna 9 may be provided, say, by a flexible coaxial cable 10 of suitable impedance.

The second branch 8 of second coupler 3 is further connected to a first input 11 of a symmetrical detector, generally designated by reference numeral 12, the second input 13 of which is connected to second branch 5 of first coupler 2. Detector 12 is of any convenient type well known per se and has two ultra-high frequency diodes 14 and 15. Detector 12 forms a phase comparator the manner of operation of which will be explained in greater detail herein-below. The outputs of diodes 14 and 15 are respectively connected to the two inputs 16 and 17 of a subtractor stage 18 included in a servo-control circuit generally designated by reference numeral 19. The output 20 of subtractor stage 18 is connected to a suitable DC amplifier 21 for amplifying the comparison signal C, which signal is used by a mechanical device (not shown) for servo-controlling the distance d of member T from surface S, which distance d is predetermined.

Emitter source 1 is well known per se and may be formed by a so-called Gunn diode having a frequency fixed within the range included between 8 GHz and 10 GHz. Source 1 feeds the two 20dB directive couplers 2 and 3. In operation, the energy picked up by first coupler 2 is reflected into the branch 5 by a movable short-circuit means 22, well known per se, and is returned to the input 13 of symmetrical detector 12. The energy picked up by second coupler 3 is returned to antenna 9 and the energy reflected by the conducting surface S placed opposite the antenna is returned to input 11 of said detector. A load 23, well known per se, disposed within branch 7 of second detector 3 absorbs the remaining energy and prevents it from being returned to source 1.

The symmetrical detector forms a phase comparator for comparing the energy picked up directly from the source and the energy reflected by surface S. The DC voltages received on the two ultra-high frequency diodes 14 and 15 are identical when the two inputs are outphased by 90°.

Mobile short-circuit means 22, which either lengthens or shortens the path covered by the energy picked up from the source, is adjusted so as to null the voltage standing-wave ratio of the antenna, that is, so that there be a zero voltage differential between the two diodes when there is no reflecting surface before the antenna.

With the system adjusted thus, there exists in front of the antenna a series of servo-control points which are a quaterwave $\lambda/4$ distant, the first point being at $\lambda/8$ relative to the antenna end nearest the surface S. The zero-output-voltage points exhibit a voltage change dependent on distance d, in an alternating sequence.

Different types of antennae may be provided by, for instance, causing the waveguide to taper off thickness-wise and by adding a reflector to permit measurements at 90°.

Referring next to FIGS. 2 and 3, it will be seen that it is possible to devise a servo-control system having two devices according to this invention. In the case of a welding machine, for example, a blowpipe or electrode 24 is placed level with a junction between two curved parts to be welded 25 and 26 and produces a weld bead 27. This being so, the blowpipe or electrode is slaved with reference to two perpendicular axes X and Y through the agency of two antennae, the one vertical 28 and the other horizontal 29, the latter being disposed ahead of the rotation axis A of the blowpipe-24/antenna-29 compound (FIG. 3).

The antennae orient the blowpipe or electrode by means of a motor 30 and supply the direction of the speed vector. The speed is delivered to a resolver 31 in the form of an AC voltage and is divided between two vectors X and Y which control the travel of an appropriate blowpipe-supporting carriage (not shown).

Reference is lastly had to FIG. 4 to show that it is possible in certain cases to maintain the welding member 32 in a fixed position with the weld line having to be always offered up to said member at an angle of 90°. In such cases, workpiece 33 is fixedly mounted on a revolving plate or like member having a motor and a resolver 34 linked with the rotation axis. Antenna 35 supplies the motor with the indications needed to maintain the tangent t to the weld line horizontal, and the resolver performs the changes of coordinates of the welding member contact point. The rate of travel of the welding member is then given by the algebraic sum of two velocities, to wit the desired and preset welding velocity and the components which result from the change of coordinates of the point of contact of the welding member with the weld line.

It goes without saying that changes and substitutions may be made in the preferred embodiments hereinbefore described without departing from the scope of the invention as set forth in the appended claims.

We claim:

1. A method of servo-controlling the distance of an object from a transiting surface to be followed by said object and capable of reflecting microwaves, by exploiting a control signal, including the steps of disposing before the surface to be followed at least one radiating unit fast with the object and providing directive microwave radiation of a radient wave, simultaneously picking up the radiation reflected by said surface on said radiating unit, forming a reference phase by adjusting the phase of a portion of the radiated wave fed to a comparison means, comparing said reference phase with the reflected microwaves and using the signal resulting from such comparison to effect the required servo-control in relation to a predetermined distance that is a multiple of a quarter-microwave.

2. A method as claimed in claim 1, in which the step of adjusting the phase is carried out so as to null the voltage standing wave ratio of the radiating unit.

3. A method as claimed in claim 1, in which the position of the object is controlled in relation to the surface to be followed.

4. A method as claimed in claim 1, in which the position of the surface is controlled in relation to the object.

5. Apparatus for servo-controlling, through the agency of mechanical means, the distance of and object from a transiting surface to be followed by said object and capable of reflecting microwaves, including at least one servo-control device comprising a microwave source connected through the respective first branches of first and second directive couplers having two branches each and having their second branches respectively connected to the two inputs of a symmetrical detector having its two outputs connected to a servo-control circuit, the second branch of the second coupler being further connected to a directively-radiating unit fast with the object and disposed facing the reflecting surface, said second branch of the first coupler including movable short-circuiting means for nulling the voltage standing-wave radio of the radiating unit.

6. A device as claimed in claim 5, in which the second branch of the first coupler includes movable short-circuiting means for nulling the voltage standing-wave ratio of the radiating unit.

7. A device as claimed in claim 5, in which the first branch of the second directive coupler includes a load for absorbing the surplus energy relative to the radiation from the radiating unit.

8. A device as claimed in claim 5, in which the servo-control circuit includes a substractor stage having its inputs connected to the detector outputs and being itself connected to a DC-amplifier for amplifying the signal issuing from the substractor stage, the output from which is applied to mechanical servo-control means.

9. Servo-control apparatus as claimed in claim 5, having two directively-radiating units disposed along two axes perpendicular to said surface, each unit being comprised within a servo-control device.

10. Apparatus as claimed in claim 5, including two directively-radiating units disposed along two axes perpendicular to said surface, each unit being comprised within a servo-control device, in which the mechanical servo-control means include a resolver and a motor connected to the surface to be followed.

11. Apparatus as claimed in claim 5, applied to an automatic metal-welding machine in which the welding member forms the object and the metal workpiece forms said reflecting surface to be followed by said welding member.

* * * * *